United States Patent

[11] 3,585,838

| [72] | Inventor | Joseph M. Newlon<br>635 N. Cass Lake Road, Pontiac, Mich. 48054 |
|---|---|---|
| [21] | Appl. No. | 716,854 |
| [22] | Filed | Mar. 28, 1968 |
| [45] | Patented | June 22, 1971 |

[54] BUCKING BAR
5 Claims, 4 Drawing Figs.

[52] U.S. Cl. ................................ 72/465, 72/479
[51] Int. Cl. ............................... B21j 13/02
[50] Field of Search .......................... 72/465, 466, 476, 479

[56] References Cited
UNITED STATES PATENTS

| 1,276,235 | 8/1918 | Loranger | 72/465 |
| 2,417,490 | 3/1947 | Hewes | 72/479 |
| 2,512,532 | 6/1950 | Sargent, et al. | 72/479 |
| 2,519,308 | 8/1950 | Brown | 72/479 |

Primary Examiner—Charles W. Lanham
Assistant Examiner—Gene P. Crosby
Attorney—Dale A. Winnie

ABSTRACT: A work tool received behind work surfaces to provide a backing member in applying impact fasteners and including interfitted toolhead and handle parts with a low-recoil impact-absorbing spacer provided therebetween to take shock loads in compression and shear.

INVENTOR.
Joseph M. Newton
BY
Dale A. Winnie
ATTORNEY

BUCKING BAR

BACKGROUND OF THE INVENTION

Rivets and like fasteners require a backing member behind the work receiving the fastener to spread the blind end of the fastener and to stabilize the two parts while they are being fastened together. Tools of this type are commonly known as bucking bars and are usually no more than a bar of iron or steel with one end formed at a right angle.

Because of the high-impact loads which these tools are subjected to, over and over again, their serviceable life is quite limited. Work hardening occurs at the neck of the tool, fractures develop and the toolhead soon breaks off. Although they are relatively inexpensive, because they are so simple in design and construction, their failure can mean an improperly set fastener, downtime, etc.

Other serious problems in the use of bucking bars is the strain and fatigue which the persons using such tools experience and the noise level incident to their use. The tool must be held tight against the work, from behind, and with one hand, while the impacting fastener is applied with a work tool held in the other hand. The shock load is transmitted through to the bucking bar and is taken fully by the operator and a high-decibel shock wave is produced.

Although there have been some suggestions for improvements in this type of tool, and notably in impact absorbing cushioning means, none have proven very successful.

SUMMARY OF THE INVENTION

This invention relates to bucking bars in general and more particularly to a tool which has a longer serviceable life, an appreciably lower fatigue factor and a lower decibel shock and vibration rating in use.

The bucking bars of this invention include two principal parts separated by a low-recoil impact-resistant urethene plastic member, to absorb the shock load and minimize vibrational effects which contribute to the otherwise high-decibel rating of the tool. They are fastened together by means that allow some relative movement between them but keeps the cushioning member in contact with both parts at all times.

In one of the preferred forms of this invention, the handle part is formed with an undercut notch towards the toolhead and the latter is formed for engagement therein so that both axial and lateral thrust loads are absorbed in the tool. This particular tool is also reversible in that the end of the handle part is also formed for taking an impact load and the head end may be used as the handle.

Another form of the invention includes mating cylindrical parts with a blind end separated to absorb the shock load.

DETAILED DESCRIPTION OF THE INVENTION

Figure 1:
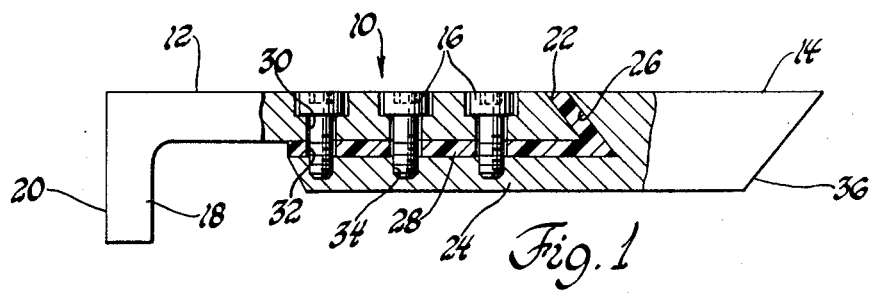
FIG. 1 is a side elevational view of a bucking bar including the features of the present invention and with a part shown in cross section for better illustration of certain details of construction.
Figure 2:
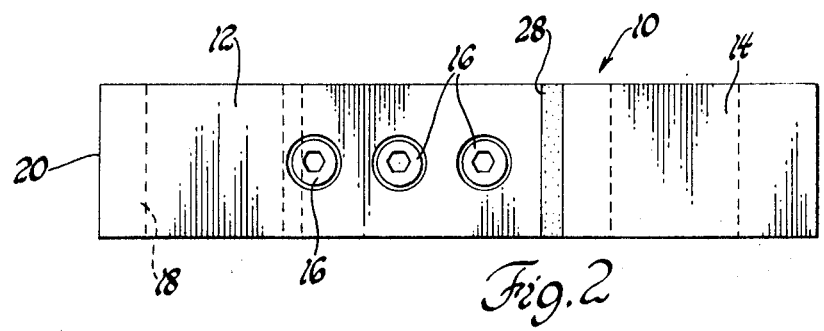
FIG. 2 is a top plan view of the bucking bar shown in the first drawing figure.

A bucking bar 10 is shown in the first two drawing figures to include a toolhead part 12 and handle part 14. Both are of bar or strap stock material, iron or steel, and they are formed to fit and be fastened together as by socket head capscrews 16.

The toolhead part 12 has one end formed at a right angle, as at 18, to provide a working face 20 which is flat and is intended to be held against the back side of a work surface. The other end of the part, which extends rearwardly, is cut at a 45° angle for relative interfitting engagement with the handle part 14; as shown at 22.

The handle part is the same width as the toolhead part 12 and about twice its thickness, or depth, at its back end. However, it is milled or otherwise formed to include a forwardly extending end 24 which is received under the rearwardly extending part of the toolhead member 12 for engagement thereto by the capscrews 16. It also includes a shoulder wall 26, undercut at about a 45° angle, which complements the terminal end 22 of the toolhead part.

Between the toolhead and handle parts is a low-recoil spacer material 28 which, as will be shown, serves to absorb the impact load and is compressible under an impact load. The spacer 28 also extends between the toolhead end 22 and undercut shoulder wall 26, as best seen in the first drawing figure, and is preferably made all in one piece.

The toolhead part 12 includes oversized holes 30, for the capscrews 16, countersunk so the heads of the screws are recessed, and which line up with holes 32 through the spacer and threaded holes 34 in the handle part 14. The cap screws are shown as relatively aligned, but they may be relatively offset to further minimize lateral play between the handle and toolhead parts, though a degree of lateral yield has no adverse effect.

As assembled for use, the bucking bar 10 has the capscrews 16 turned down and locked (by a lock washer or knurled undersurface, not shown) to hold the handle and toolhead parts together with the spacer material 28 under compression both between their adjacent top and bottom faces and their interlocked ends 22 and 26. The part of the spacer between the end walls need not be under the same compressive load but should have the end walls engaged with it. In the drawing, a spacing is shown on both sides of the capscrews in the oversized holes 30 but in practice shoulder engagement on the back side of the holes is preferred for compressive loading of the spacer at the relatively butting ends of the toolhead and handle parts.

Under a shock load on the working face 20 of the toolhead part 12, the rearward vectoral force is taken in the low-recoil impact-absorbing material between the interfitting ends of the toolhead and handle parts, while the movement forces are absorbed in the spacer material between the planular faces of the two parts. The two parts are allowed a degree of relative movement because of the oversized screw holes 30 and sufficient for the compressive and shear loads on the spacer material to be absorbed and to damp the shock wave normally transmitted to the person holding the bucking bar tool.

The ability of the tool to flex, in a sense, at its center, due to the yield of the compressive material, also assures longer serviceable life in the tool and less work hardening at the neck of the tool.

Figure 3:
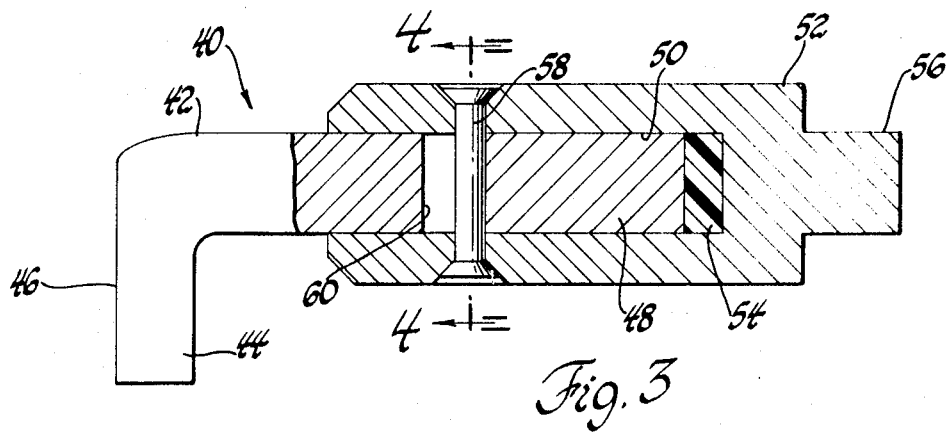
FIG. 3 is a side elevational view of another form of bucking bar including the teachings of this invention.
Figure 4:
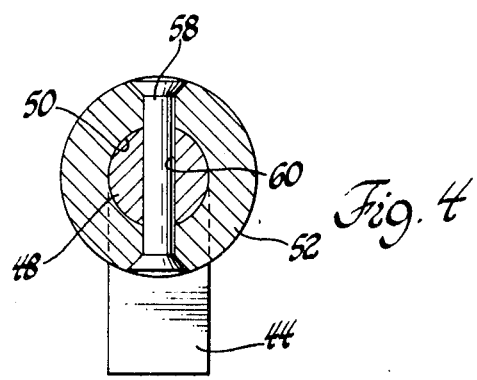
FIG. 4 is a cross-sectional view of the bucking bar in the previous drawing figure as seen in the plane of line 4—4 therein and looking in the direction of the arrows.

In FIGS. 3 and 4 another form of bucking bar 40 is shown. This tool includes a toolhead member 42, with a right-angle end 44 (and a flat work face 46) but with a cylindrical shank 48 that fits into a bore 50 in the handle part 52. The latter has a spacer 54 at the end of the borehole, and a mass 56 formed therebehind, and includes a cross pin 58 through an elongated slot 60 in the shank 48 of the interfitting toolhead part.

The close fitting telescopic interengagement of the handle and toolhead parts, over an extended length, avoids the necessity for spacer material therebetween and the end-loading spacer 54, of a like low-impact shock-absorbing material, is all that is needed. The cross pin 58 has a shoulder engagement against the backwall of the slot 60, as shown, and holds the parts together but still allows the compressive reaction desired.

Both of the bucking bars 10 and 40 may be held by the toolhead part to use the terminal end of the handle part for butting against a work surface, if desired. The end of handle part 14 in the first drawing figure is shown to have its end 36 cut at an angle so that the load is taken in compression in the spacer 28 between the two parts and to better facilitate the blind positioning of the tool behind work surfaces.

The two embodiments of this invention which have been shown and described are to illustrate the inventive concept and are not intended to limit the scope of the invention to structural details, except as specifically set forth in the appended claims. All variations, modifications and improvements within the language of the claims is also to be accorded recognition as within the spirit and teachings hereof.

I claim:

1. A bucking bar, comprising: toolhead and handle parts secured together and having a low recoil impact absorbing and compressible spacer provided therebetween, said toolhead and handle parts being formed for interfitting engagement and butt end shouldered engagement of the former against the latter, and fastener means extending transversely across and between said toolhead and handle parts for holding said toolhead and handle parts engaged with said spacer and for allowing relative movement therebetween in the impact absorbing compression of said spacer, said toolhead and handle parts having interfitting planular wall surfaces extending longitudinally and said fastener means provided therethrough.

2. A bucking bar, comprising: toolhead and handle parts secured together and having a low-recoil impact-absorbing and compressible spacer provided therebetween, said toolhead and handle parts being formed for interfitting engagement and butt end shouldered engagement of the former against the latter, and fastener means extending transversely across and between said toolhead and handle parts for holding said toolhead and handle parts engaged with said spacer and for allowing relative movement therebetween in the impact absorbing compression of said spacer, said toolhead part comprising a flat bar stock having one end formed at a right angle thereto and the other end cut at an inclined angle, and said handle part including a planular wall surface receptive of said flat bar stock next thereto and having an undercut shoulder receptive of the angular cut end of said toolhead part therein.

3. The bucking bar of claim 2, said spacer extending between said toolhead and handle parts longitudinally thereof and within said undercut shoulder.

4. The bucking bar of claim 3, the planular wall surface of said handle part being disposed next adjacent the underside of said toolhead part.

5. The bucking bar of claim 4, said fastener means including bolts having threaded engagement with said handle part and shouldered engagement with said toolhead part in oversized bolt holes provided therein.